United States Patent [19]

Chuang et al.

[11] Patent Number: 5,322,924
[45] Date of Patent: Jun. 21, 1994

[54] ADDITION POLYIMIDES WITH ENHANCED PROCESSABILITY

[75] Inventors: Chun-Hua K. Chuang, Brecksville; Raymond D. Vannucci, Brooklyn, both of Ohio

[73] Assignee: The United States of America as represented by the United States National Aeronautics and Space Administration, Washington, D.C.

[21] Appl. No.: 772,181

[22] Filed: Oct. 7, 1991

[51] Int. Cl.$^5$ .................. C08C 73/10; C08C 69/26
[52] U.S. Cl. ........................ 528/353; 528/125; 528/126; 528/128; 528/172; 528/173; 528/174; 528/176; 528/188; 528/220; 528/229; 528/350; 528/351; 524/600
[58] Field of Search ............ 528/353, 350, 351, 220, 528/229, 174, 176, 173, 172, 125, 128, 126, 188; 524/600

[56] References Cited

U.S. PATENT DOCUMENTS

| | | | |
|---|---|---|---|
| 3,745,149 | 7/1973 | Serafini et al. | 528/353 |
| 4,433,132 | 2/1984 | Rogers et al. | 528/191 |
| 4,560,742 | 12/1985 | Pater | 528/342 |
| 4,868,270 | 9/1989 | Lubowitz et al. | 528/170 |
| 5,071,997 | 12/1991 | Harris | 528/353 |
| 5,091,505 | 2/1992 | Serafini et al. | 528/353 |
| 5,149,772 | 9/1992 | Serafini et al. | 528/353 |

OTHER PUBLICATIONS

Harris, F. W. et al., "Synthesis and Characterization of Polyimides Based on 2,2'-Bis(Trifluoromethyl)-4,-4'-Diaminobiphenyl", *Polymer Preprints*, vol. 31, No. 1, (1990), p. 342.

Vannucci, R. D. et al., "PMR Polyimides with Improved High Temperature Performance." NASA Technical Memorandum (1976).

Vannucci, R. D. et al., "700° F. Properties of Autoclave Cured PMR-II Composites." NASA Technical Memorandum (1988).

Serafini, T. T. et al., "Second Generation PMR Polyimides", NASA Technical Memorandum (1976).

Vannucci, R. D., "PMR Polyimide Compositions for Improved Performance at 371° C.", NASA Technical Memorandum (1987).

Serafini, T. T. et al., "Lower-Curing-Temperature PMR Polyimides." NASA Technical Memorandum (1981).

Primary Examiner—John Kight, III
Assistant Examiner—P. Hampton-Hightower
Attorney, Agent, or Firm—James A. Mackin; Gene E. Shook; Guy M. Miller

[57] ABSTRACT

Addition polyimide resins having improved thermo-oxidative stability and enhanced processability are prepared by the reaction of a mixture of monomers comprising a non-planar polyphenyl diamine (a), a diester of tetracarboxylic acid or the corresponding dianhydride (b) and an end-capping agent (c), or a diamine (d), a non-planar polyphenyl diester or dianhydride of a tetracarboxylic acid (e) and an end-capping agent (c).

4 Claims, 4 Drawing Sheets

ADDITION POLYIMIDES WITH ENHANCED PROCESSABILITY

ORIGIN OF THE INVENTION

The invention described herein was made by employees of the U.S. government and may be manufactured and used by or for the government without the payment of any royalties thereon or therefor.

BACKGROUND OF THE INVENTION

The present invention is directed to polyimide resins having improved thermo-oxidative stability. The polyimide resins are generally useful in applications where high strength and temperature capabilities are required at temperatures up to about 700° F. Polyimide resins have been particularly useful in applications such as jet engine compressor components, for example, blades, vanes, air seals, air splitters, and engine casing parts.

Polyimides having excellent high temperature oxidative and thermal stability and outstanding mechanical properties are described in U.S. Pat. No. 3,745,149 to Serafini et al. These polyimides, also referred to as PMR (in situ polymerization of monomer reactants) polyimides, are the most widely used addition-type polyimide matrix resins for aerospace applications requiring use temperatures of 450° F. and higher.

Two versions of PMR polyimide resins are referred to as first and second generation PMR's (PMR I and PMR II respectively). These addition-type polyimides comprise monomer components of diester, diamine and an end-capper in a stoichiometric ratio of n moles of diester, n+1 moles of diamine and 2 moles of the end-capper. The first generation PMR polyimides comprise the monomethyl ester of 5-norbornene-2,3-dicarboxylic acid, the dimethyl ester of 3,3',4,4'-benzophenonetetracarboxylic acid and 4,4'-methylenedianiline. The monomers used for second generation PMR polyimides are the monomethyl ester of 5-norbornene-2,3-dicarboxylic acid, the dimethyl ester of 4,4'-(hexafluoroisopropylidene-bis(phthalic acid)), and p-phenylenediamine. These polyimides both employ the monomethyl ester of 5-norbornene-2,3-dicarboxylic acid as the end-capper, but differ in the diester and diamine used to prepare the resin. See U.S. Pat. No. 3,745,149.

Prior investigations show that the 371° C. oxidative stability of PMR and PMR II resin formulations improves as the molecular weight is increased. But this improvement reaches a plateau at a molecular weight of 5000. See Vannucci, "PMR Polyimide Compositions for Improved Performance at 371° C.", 32nd Int'l SAMPE Symposium and Exhibition, April 1987. In addition, high molecular weight (HMW) PMR polyimides require higher curing temperatures and higher pressures than low molecular weight polyimides.

Melting temperature and melt viscosity are related to a polymer's molecular weight. Accordingly, the resin flow of HMW PMR polyimides is restricted during processing. As a result, low molecular weight prepolymers are easier to process, but lack the excellent thermal oxidative stability provided by HMW polyimides.

One type of PMR polyimide is disclosed in U.S. Pat. No. 4,560,742 to Pater. The disclosed polyimides are derived from a dialkyl or tetraalkyl ester of an aromatic tetracarboxylic acid, an aromatic diamine, an end-cap of a monoalkyl or dialkyl ester of a dicarboxylic acid, and an N-arylnadimide such as N-phenylnadimide. Graphite composites may be formed from the polyimide resins having a life of 1700 hours at 600° F. in air.

Low curing temperature PMR polyimides are disclosed by Serafini et al, "Lower-Curing-Temperature PMR Polyimides", NASA Technical Memorandum 81705, Thirty-sixth Annual Conference of the Reinforced Plastics Composites Institute of the Society of the Plastics Industry, Inc., 1981. An endcap of m-aminostyrene was used for reducing the cure temperature requirements of PMR polyimides. The use temperature of these composites, however, is limited to about 260° C. (500° F.).

U.S. Pat. No. 4,739,030 to Lubowitz et al discloses difunctional end-capped monomers, which can be linked to form thermoset polymers.

Polyesters containing fluorinated units are known. U.S. Pat. No. 4,433,132 to Rodgers et al discloses thermoplastic polyesters containing 2,2'-bis(trifluoromethyl)-biphenylene units. The resultant polyesters are said to exhibit favorable solubility properties and are useful for producing films and fibers.

While the above patents are directed to resins having certain desirable properties, there continues to be a need for higher molecular weight polyimide resins having improved properties, and in particular, having improved thermo-oxidative stability and easy processing.

SUMMARY OF THE INVENTION

The present invention is directed to non-planar polyimides having improved thermo-oxidative stability and enhanced processability. In a preferred embodiment, the present invention is directed to high molecular weight polyimides obtained by reacting a non-planar polyphenyl diamine, a diester or dianhydride of a tetracarboxylic acid, and an end-capping compound. In an alternative embodiment, a planar diamine may be reacted with a non-planar diester diacid (or dianhydride) and an end-capping compound. Low void materials with improved oxidative stability when exposed to 343°–371° C. (approximately 649°–700° F.) air may be fabricated as high molecular weight end-capped polyimide prepregs and composites.

BRIEF DESCRIPTION OF THE DRAWINGS

The present invention can be more completely understood by reference to the drawings, wherein.

DETAILED DESCRIPTION OF PREFERRED EMBODIMENTS

Figure 1:
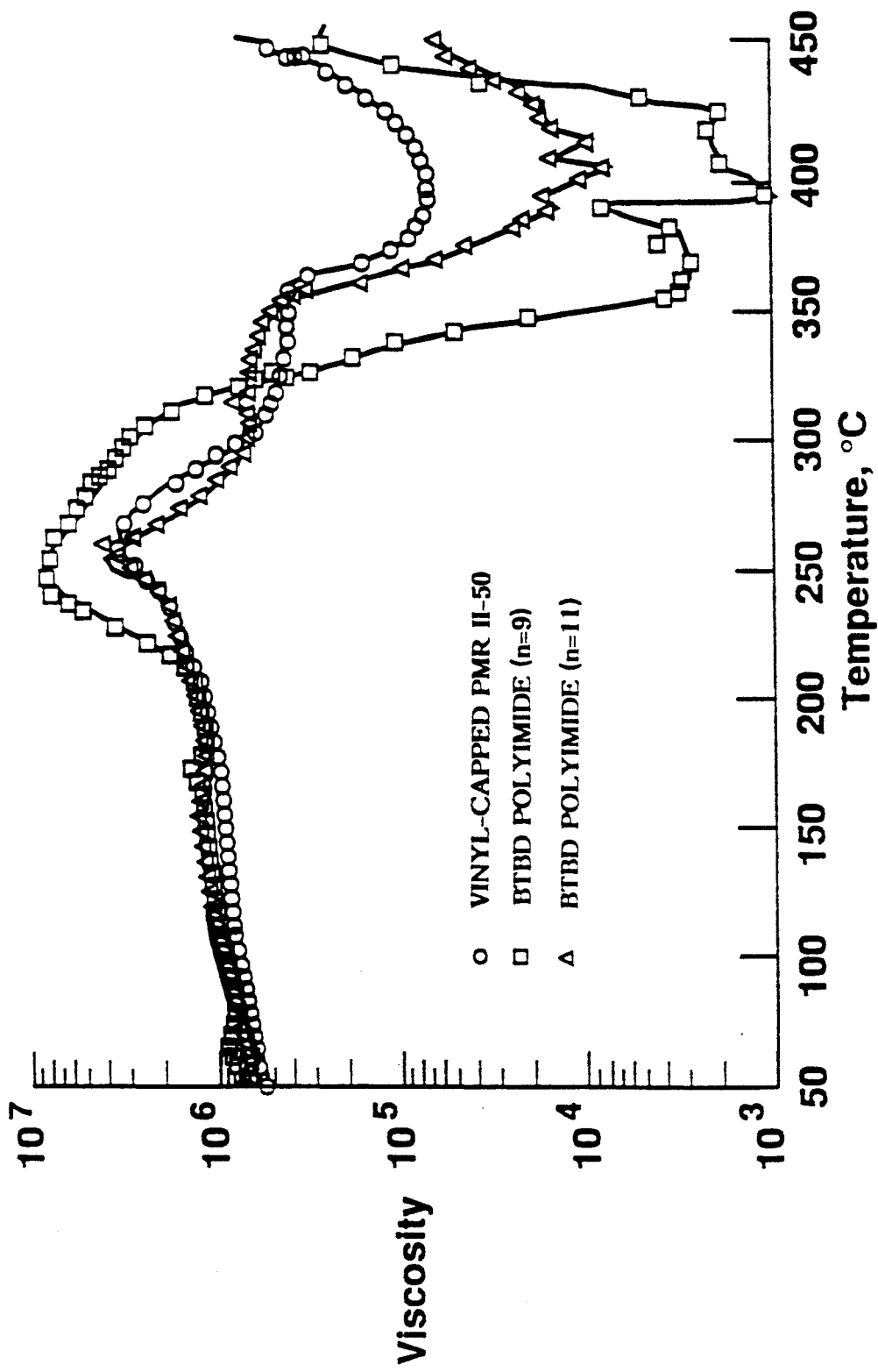
FIG. 1 is a plot of temperature against viscosity for a polyimide of the invention and a known second generation polyimide.

The present invention provides addition polyimides having improved thermo-oxidative stability and enhanced processability. The non-planar conformation enhances solubility of the diamine, dianhydride and tetracarboxylic acid ester. This non-planar conformation also enhances resin flow of the final product.

The polyimides of this invention overcome processing difficulties involved with using HMW PMR's. For example, they have reduced the melting temperature and melt viscosity normally required and thereby permit substantially increased resin flow in processing of HMW PMRs. The polyimides of the invention possess excellent thermo-oxidative stability at 343°-371° C. for composite applications. In addition, the polyimides of the invention display a low thermal expansion coefficient and a narrow molecular weight distribution at higher molecular weights.

The addition polyimides of the invention may be obtained by reacting a polyphenyl diamine having substantially non-coplanar phenyl groups (a) with a diester or dianhydride of a tetracarboxylic acid (b) and an end-capping compound (c) in a molar ratio of n:(n+1):2 when the end-capping compound contains nitrogen, and in a molar ratio of (n+1):n:2 when the end-capping agent does not contain nitrogen (n is preferably between about 1 and about 20, more preferably about 9 to 11).

The non-planar polyphenyl diamine (a) preferably comprises two to four phenyl groups, and contains substituents which force the phenyl groups into a non-coplanar arrangement.

The diester of tetracarboxylic acid (b) may be substantially any diester diacid, preferably a $C_{1-4}$ alkyl ester of a tetracarboxylic acid.

The end-capping compound (c) may be any of a dozen or more well known addition curing endcaps.

Preferred monomers employed in the present invention are represented by the following formulas:

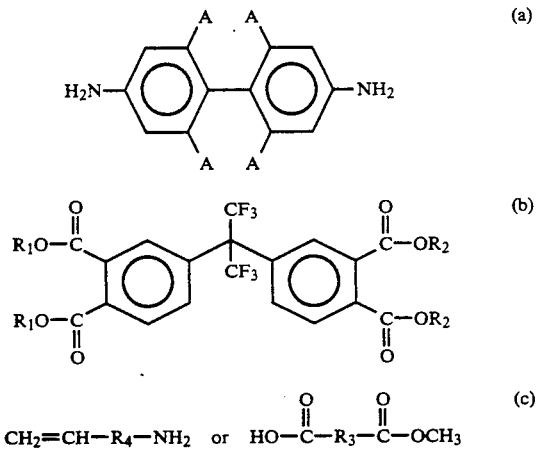

where A is $CX_3$, X, or phenyl and X is hydrogen or halogen, preferably fluoride or bromide, and at least two of the A groups are not hydrogen; each of $R_1$ and $R_2$ is a lower alkyl radical or hydrogen, for example methyl, ethyl, n-propyl, isopropyl, or butyl, preferably methyl, with at least one $R_1$ and one $R_2$ being alkyl; $R_4$ is a divalent aryl radical; and $R_3$ is a bicyclic radical.

Preferred diamines include:

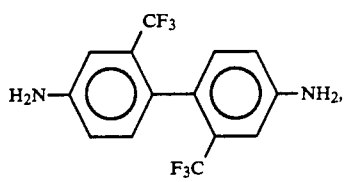

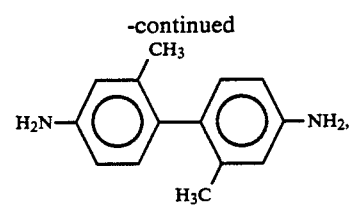

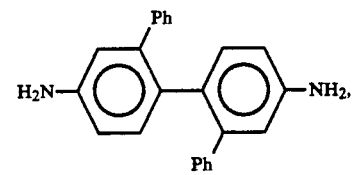

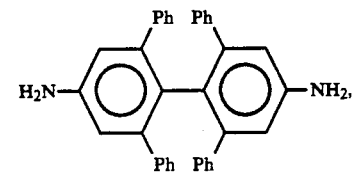

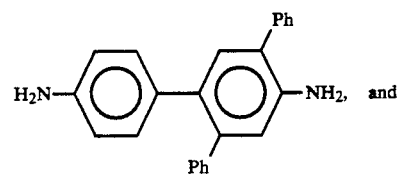

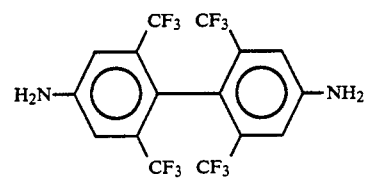

wherein Ph represents phenyl.

The above non-planar diamine (a) may be synthesized according to known methods, for example in the following manner:

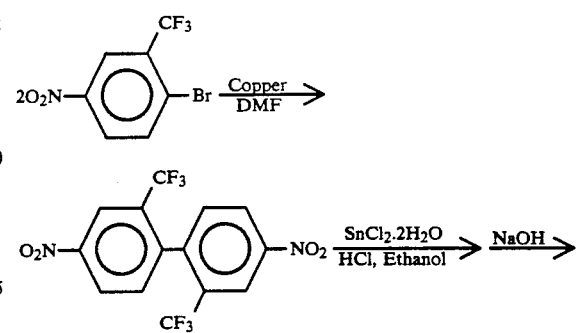

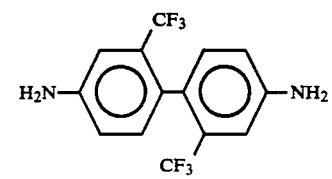

Esters of the tetracarboxylic acid (b) may be readily prepared according to known methods, for example from corresponding dianhydrides of the formula:

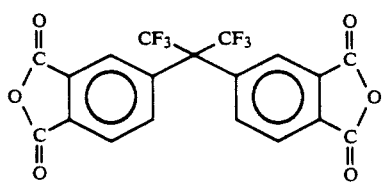

Examples of other dianhydrides which may be employed include pyromellitic dianhydride, 3,3',4,4'-benzophenonetetra-carboxylic dianhydride, 4,4'-(hexafluoroisopropylidene)-bis(phthalic anhydride), bis(3,4-dicarboxyphenyl) sulfone dianhydride, bis(3,4-dicarboxyphenyl) ester dianhydride, 1,2,5,6-naphthalene tetracarboxylic dianhydride, 2,3,6,7 naphthalene tetracarboxylic dianhydride, 3,3',4,4'-diphenyl tetracarboxylic dianhydride, 1,4,5,8-naphthalene tetracarboxylic dianhydride, and 4,4'-oxydiphthalic anhydride.

End-capping compounds (c) can be readily prepared according to known methods. Examples of preferred end-capping compounds include p-aminostyrene and endo-5-norbornene- 2,3-dicarboxylic acid (nadic ester), as well as maleic and acetylenic endcaps.

In an alternative embodiment, the addition polyimides of the invention may be obtained by reacting a difunctional aromatic amine (d) with a polyphenyl diester or dianhydride of a tetracarboxylic acid having substantially non-coplanar phenyl groups (e) and an end-capping compound (c). The molar ratios are the same as above.

Any appropriate difunctional aromatic diamine (d) may be used. Examples include p-phenylenediamine, m-phenylenediamine, benzidine, 4,4'-oxydianiline, 4,4'-thiodianiline, 4,4'-diaminodiphenyl sulfone, and the non-planar polyphenyl diamines (a) discussed above.

The polyphenyl diester or dianhydride of a tetracarboxylic acid preferably comprises two to four phenyl groups, and contains substituents which force the phenyl groups into a non-coplanar arrangement. The diester is preferably $C_{1-4}$ alkyl ester. Preferred diesters and dianhydrides include:

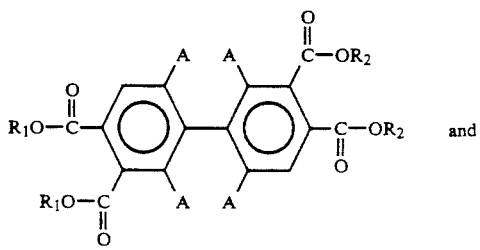

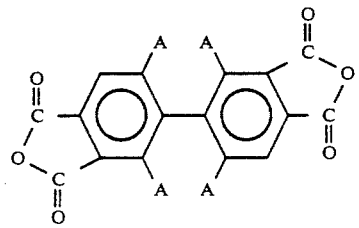

wherein A, $R_1$ and $R_2$ are as defined above. In especially preferred diesters and dianhydrides, the biphenyl moiety may be represented as

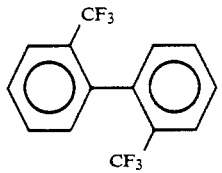

An organic solvent may be employed to dissolve the monomers. The solvent must not react with the ester, amine or end-capping compound under the processing conditions. Representative examples of suitable solvents include aliphatic alcohols (preferably methanol or ethanol), aliphatic alcohol ethers, and aprotic solvents such as N,N-dimethyl formamide, and 1-methyl-2-pyrrolidinone. Mixtures of two or more solvents may also be employed.

When the monomer solutions are heated at temperatures of about 120°F to about 300°F (50°C to 150°C), the monomers react to form end-capped prepolymers. The molecular weights of these prepolymers may range, for example, from about 1400 when n=1 to about 15000 when n=20.

If an end-capping monomer is selected containing an —NH₂ group, the structure of a preferred prepolymer may be represented by the formula:

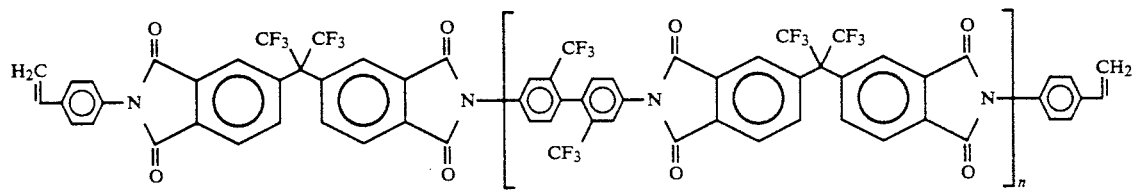

wherein n is about 9 to about 11. The molecular weight of such end-capped prepolymers may be adjusted to desired values by varying the value of the number n between about 9 and about 11, provided that a molar ratio of n:(n+1):2 is maintained for the relationship of a:b:c.

If an end-capping monomer is selected containing a bicyclic group, the structure of a preferred prepolymer may be represented by the formula:

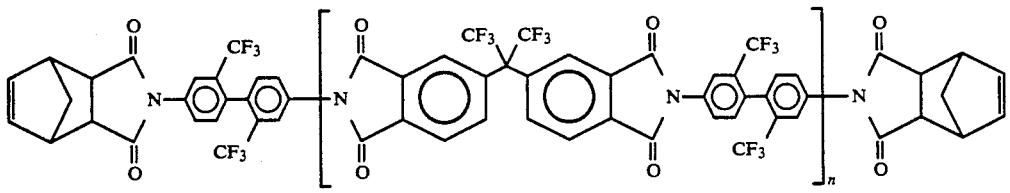

wherein n is as defined above. A molar ratio of (n+1):n:2 must be maintained for the relationship of a:b:c.

The invention will be further illustrated by the following, non-limiting examples, it being understood that these examples are intended to be illustrative only and that the invention is not intended to be limited to the materials, conditions, or process parameters recited herein.

EXAMPLE 1

2,2'-Bis(trifluoromethyl)-4,4'-diaminobiphenyl (BTBD) is prepared in a two step synthesis from 2-bromo-5-nitrobenzotrifluoride according to known procedures. See Rodgers et al, "Amorphous, Birefringent, Para-Linked Aromatic Polyimides," *Macromolecules*, Vol. 18, no. 6, pp. 1058–1068 (1985). The BTBD is then mixed with dimethyl ester of 4,4'-(hexafluoroisopropylidene)-bis-(phthalic acid) (HFDE) and either nadic ester (nadic) or p-amino-materials, conditions, or process parameters recited herein.

EXAMPLE 1

2,2'-Bis(trifluoromethyl)-4,4'-diaminobiphenyl (BTBD) is prepared in a two step synthesis from 2-bromo-5-nitrobenzotrifluoride according to known procedures. See Rodgers et al, "Amorphous, Birefringent, Para-Linked Aromatic Polyimides," *Macromolecules*, Vol. 18, no. 6, pp. 1058–1068 (1985). The BTBD is then mixed with dimethyl ester of 4,4'-(hexafluoroisopropylidene)-bis-(phthalic acid) (HFDE) and either nadic ester (nadic) or p-amino-styrene (vinyl) endcaps in methanol. The resulting resin powders are imidized at 204° C. and then placed in a mold at 288° C. for two hours under 1500 psi. Subsequently, the molded product is compressed at 357° for two hours and at a pressure less than 1500 psi.

TABLE I

| | DSC THERMAL ANALYSIS | |
|---|---|---|
| Polyimide* | Onset of Melting endotherms (° C.) | Glass transition temperature ($T_g$, °C.) |
| Nadic/BTBD Polyimide | 210 | — |
| Nadic/PMR-II (formula weight = 5000) | 225 | — |
| Nadic/PMR-II (formula weight = 7000) | 226 | — |
| Vinyl-capped/ BTBD Polyimide | 233 | — |
| Vinyl-Capped/PMR-II (formula weight = 5000) | — | 250 |

*The first entry is the end capping compound, followed by the polyimide tested.

Table I lists the onset of melting for BTBD-containing oligomers and second-generation oligomers using differential scanning calorimetry (DSC) thermal analysis. The analyzed oligomers are uncured and formulated with the same n value (n=9). Table I shows that nadic-capped oligomers of the invention begin melting at temperatures lower than the nadic-capped PMR-II oligomers. While the vinyl-capped oligomer of the invention starts melting at 233° C., the vinyl-capped/2nd generation polyimides (formula molecular weight=5000) show a glass transition temperature at 250° C.

The enhanced processability of the fluorinated polyimides is also evidenced by weight loss measurements. Table II shows that the polymers of the invention are more stable toward heat than 2nd generation polyimides (formula molecular weight=5000) whether vinyl capped or not.

TABLE II

| THERMAL GRAVIMETRIC ANALYSIS (TGA) | |
|---|---|
| Resin Type | Temperature for 5% weight loss in air,[a] °C. |
| PMR-II (formula weight = 5,000) | 463 |
| BTBD Polyimide (nadic-capped) | 482 |
| Vinyl-Capped PMR-II (formula weight = 5000) | 483 |
| Vinyl-Capped BTBD Polyimide | 493 |

[a]Heating rate of 10° C./min.

A 5% weight loss in the polymers of the invention occurs at temperatures higher than the temperature at which 5% weight loss occurs in 2nd generation polyimides (formula molecular weight=5000) or vinyl-capped 2nd generation polyimides.

Figure 2:
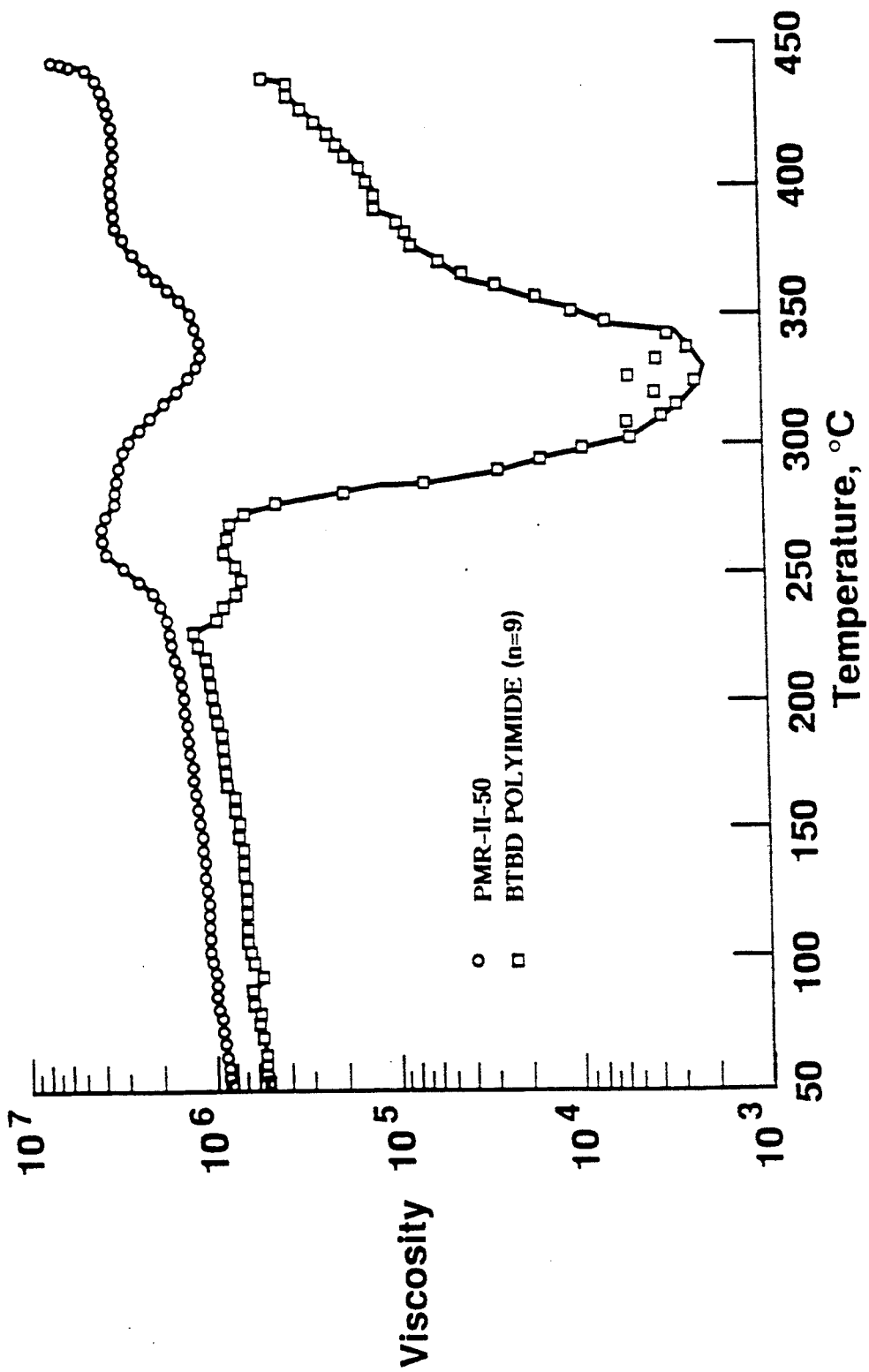
FIG. 2 is a plot of temperature against viscosity for vinyl-capped polyimides of the invention and a known first generation vinyl-capped polyimide.

FIGS. 1 and 2 confirm the enhanced processability of the present polyimides. Both figures show that the polyimides of the invention have lower viscosity than the corresponding PMR-II polyimides. Thus, the HMW polyimides of this invention provide processing advantages previously unknown, without detrimentally affecting thermal oxidative stability.

When the Table II resins are exposed to 1 atm of constant air flow at 343° C., the long term thermo-oxidative stability (TOS) of these resins increases in the following order:

| | |
|---|---|
| 1. 2nd generation polyimide (formula molecular weight = 5000) | LOW |
| 2. nadic ester capped BTBD based polyimide | ↓ |
| 3. vinyl-capped 2nd generation polyimide | ↓ |
| 4. vinyl-capped BTBD based polyimide | HIGH |

In each case, the resins of the invention have higher TOS values than their counterparts.

EXAMPLE II 2,2'-bis(trifluoromethyl)-benzidine is combined with 4,4'-(hexafluoroisopropylidine)-bis(phthalic acid) and p-aminostyrene. The combination is heated for 1 hour at 400° F. to form a polymer. The polymer is reheated for 1 hour at 550° F. and then heated again at 650° F. under a pressure of 500 psi to form crosslinked polymers.

EXAMPLE III

The same steps and ingredients of Example II are repeated except monomethyl ester of endo-5-norbornene-2,3-dicarboxylic acid is used as the end-capping compound.

EXAMPLE IV

Laminate Fabrication

A mixture of 0.8927 g of p-aminostyrene, 38.11 g of a 50 weight percent methanolic solution of dimethyl ester of 4,4'-(hexafluroroisopropylidene)-bis-(phthalic acid) (HFDE), 10.803 g of 2,2'-bis(trifluoromethyl)-4,4'-diaminobiphenyl (BTDB) and 12 g of methanol is prepared at room temperature.

Figures 3A, 3B:
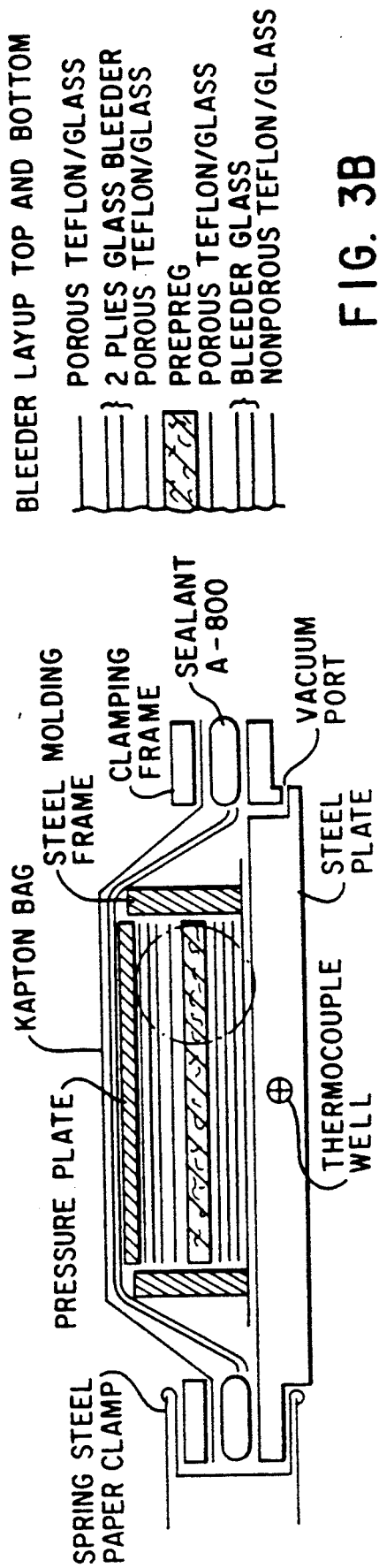
FIGS. 3A and B show an autoclave arrangement for formation of a laminate fabricated from the composition of the invention.

Approximately 36 g of an intermediate modulus graphite fiber (Celanese G40-600) is impregnated with the above solution. The impregnated fibers are dried at room temperature to reduce their solvent content to 3–7% by weight. They are then cut into 3 inch by 8 inch plies, and stacked unidirectionally into a 12 ply stack. The laminates are then bagged for final curing in an autoclave. FIG. 3 shows a ply stack which has been vacuum-bagged for final curing under the heat and pressure of an autoclave. The vacuum bag system 10 generally comprises a Kapton (TM) bagging film 13 (a polyimide film bag available from du Pont) secured to a steel plate 14 by a high temperature sealant 19 and a spring steel paper clamp 11. The steel plate 14 has a thermocouple wall 15 which, along with a steel molding frame 16 and a pressure plate 17, holds the impregnated fibers in place. Vacuum port 18 is provided for maintaining a vacuum within the Kapton (TM) bag during curing. Sealant 19 is provided within the clamping frame 12.

A bleeder layup permits condensation products to be evacuated from the bagged layup. In particular, the bleeder layup comprise a porous Teflon (trademark for polytetrafluoroethylene)/glass 21, two plies of glass bleeder 22, a porous Teflon/glass 23, prepreg 24, a porous Teflon/glass 25, two plies of glass bleeder 26, and non-porous Teflon/glass 27. The porous teflon glass is glass fabric coated with Teflon and used as a release ply (also shown as a peel ply).

Figure 4:
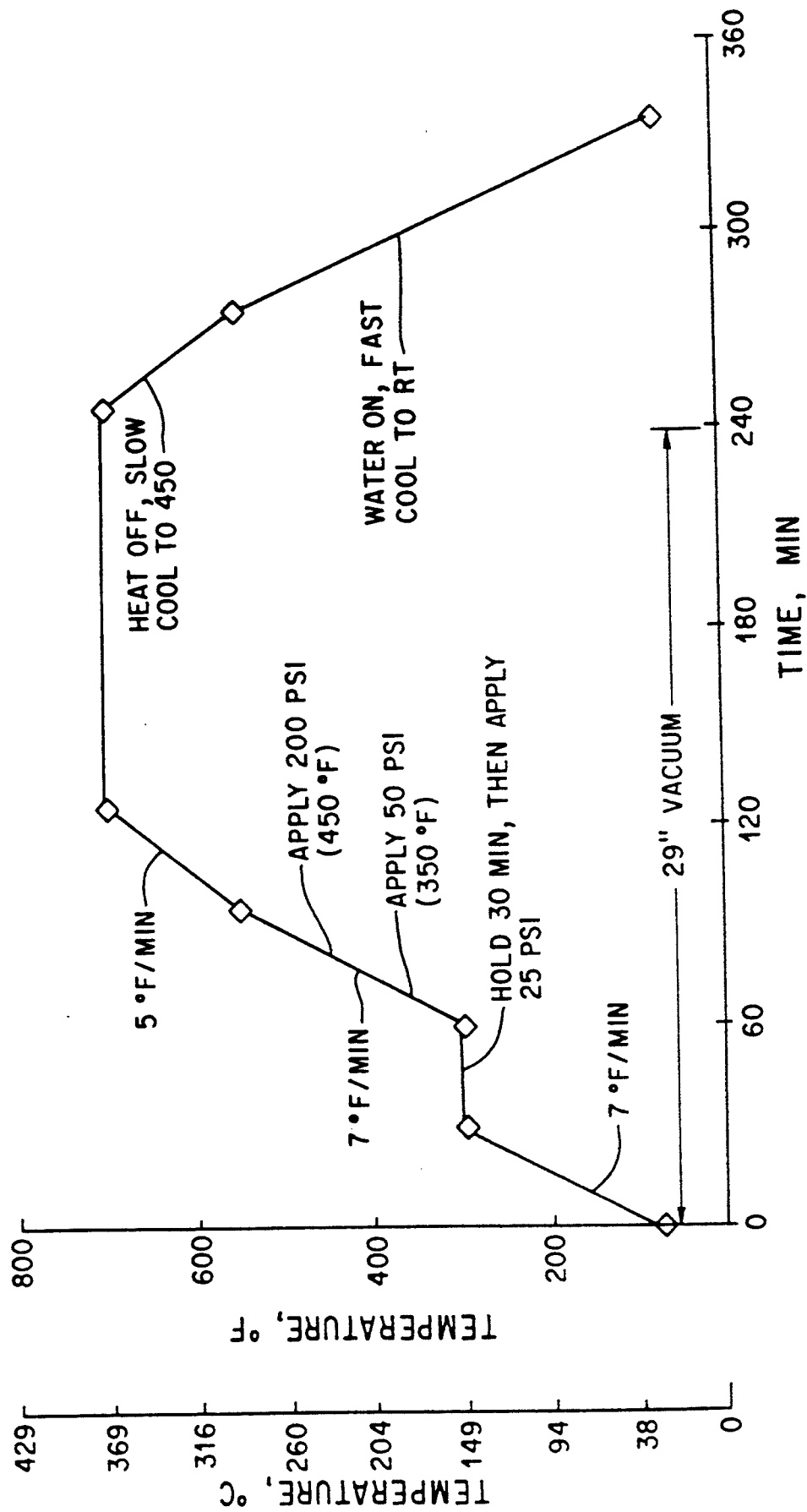
FIG. 4 shows the autoclave curing cycle of the laminate shown in FIGS. 3A and B after it has been cured in an autoclave.

FIG. 4 corresponds to the autoclave curing cycle of the ply stack shown in FIG. 3. The resulting graphite fiber reinforced polyamide laminate is essentially void free, and exhibits excellent oxidative stability at temperatures up to 700° F. Furthermore, the laminate retains 96.5% of its initial weight and 100% of its initial 650° F. short beam shear strength after exposure to air at 650° F. for 2000 hours.

What is claimed is:

1. A composition of matter comprising a diamine, a diester or dianhydride of a tetracarboxylic acid, and an end-capping compound, wherein at least one member selected from the group consisting of said diamine, said diester and said dianhydride is a polyphenyl compound having substantially non-coplanar phenyl groups and wherein said diester or dianhydride is respectively represented by the structure

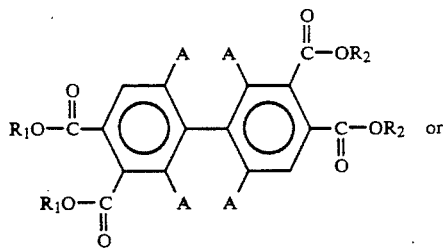

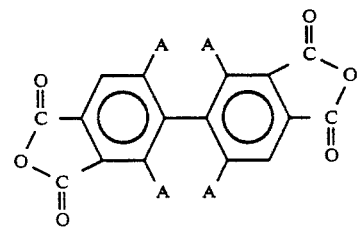

wherein A is $CX_3$, X or phenyl and X is hydrogen or halogen, and $R_1$ and $R_2$ are each a lower $C_{1-4}$ alkyl or hydrogen, with at least one $R_1$ and one $R_2$ being alkyl.

2. The composition of matter of claim 1, wherein X is fluorine or bromine.

3. A process for preparing a polyimide resin, comprising reacting a diamine, a diester or dianhydride of a tetracarboxylic acid, and an end-capping compound, wherein at least one member selected from the group consisting of said diamine, said diester and said dianhydride is a polyphenyl compound having substantially non-coplanar phenyl groups and wherein said diester or dianhydride is respectively represented by the structure

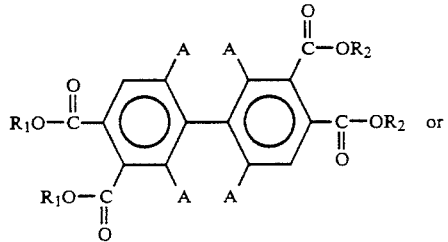

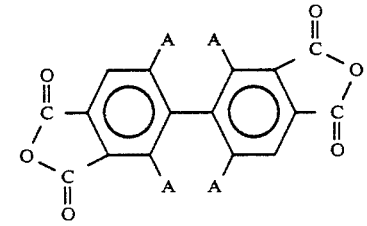

wherein A is $CX_3$, X or phenyl and X is hydrogen or halogen, and $R_1$ and $R_2$ are each a lower $C_{1-4}$ alkyl or hydrogen, with at least one $R_1$ and one $R_2$ being alkyl.

4. The process of claim 3, wherein X is fluorine or bromine.

* * * * *